US009550115B2

(12) United States Patent
Silva

(10) Patent No.: US 9,550,115 B2
(45) Date of Patent: Jan. 24, 2017

(54) URINAL GAMING SYSTEM

(71) Applicant: Christopher Anthony Silva, Little Egg Harbor, NJ (US)

(72) Inventor: Christopher Anthony Silva, Little Egg Harbor, NJ (US)

( * ) Notice: Subject to any disclaimer, the term of this patent is extended or adjusted under 35 U.S.C. 154(b) by 0 days.

(21) Appl. No.: 13/654,890

(22) Filed: Oct. 18, 2012

(65) Prior Publication Data

US 2013/0102371 A1 Apr. 25, 2013

Related U.S. Application Data

(60) Provisional application No. 61/548,977, filed on Oct. 19, 2011.

(51) Int. Cl.

| | |
|---|---|
| ***A63F 13/00*** | (2014.01) |
| ***A63F 13/218*** | (2014.01) |
| ***A63F 9/24*** | (2006.01) |
| ***A63F 13/2145*** | (2014.01) |
| ***A63F 13/327*** | (2014.01) |
| ***A47K 11/00*** | (2006.01) |
| ***A63F 9/00*** | (2006.01) |

(Continued)

(52) U.S. Cl.

CPC ............ *A63F 13/218* (2014.09); *A47K 11/00* (2013.01); *A63F 9/001* (2013.01); *A63F 9/02* (2013.01); *A63F 9/24* (2013.01); *A63F 13/00* (2013.01); *A63F 13/06* (2013.01); *A63F 13/12* (2013.01); *A63F 13/2145* (2014.09); *A63F 13/327* (2014.09); *G07F 17/00* (2013.01); *A63F 13/837* (2014.09); *A63F 2009/0012* (2013.01); *A63F 2009/241* (2013.01); *A63F 2009/2442* (2013.01); *A63F 2250/04* (2013.01); *A63F 2250/26* (2013.01); *A63F 2250/606* (2013.01); *A63F 2300/1056* (2013.01); *A63F 2300/1062* (2013.01); *A63F 2300/1068* (2013.01); *A63F 2300/1075* (2013.01); *A63F 2300/404* (2013.01); *A63F 2300/8094* (2013.01); *E03D 13/005* (2013.01)

(58) Field of Classification Search

CPC ................. A63F 2009/241; A63F 2009/2442; A63F 2250/04; A63F 9/02

USPC ....................................... 4/661, 304; 463/49

See application file for complete search history.

(56) References Cited

U.S. PATENT DOCUMENTS 6,385,796 B1 * 5/2002 Muir, Jr. ................ E03D 13/00 4/304

2005/0288105 A1 * 12/2005 Piccionelli ............ A63F 9/0204 463/49

FOREIGN PATENT DOCUMENTS

DE 20317358 U1 * 4/2004

GB 2351453 A * 1/2001

* cited by examiner

*Primary Examiner* — David L Lewis

*Assistant Examiner* — Eric M Thomas

(74) *Attorney, Agent, or Firm* — Porzio, Bromberg & Newman, P.C.

(57) ABSTRACT

A gaming system installable in a urinal or toilet in which a removably attached pressure and location sensor assembly can be wirelessly coupled to a data server. The data server can include a user interface allowing the user to initiate a gaming session, such as through a touch screen monitor positioned above or nearby the urinal. The data server can collect and store data from the pressure and location sensor. The data server can be coupled to a plurality of touch screen monitors and pressure and location sensor assemblies for providing a multi-user gaming environment. Collected and processed data can be presented in real time on the touch screen monitors and can be stored in a database.

15 Claims, 3 Drawing Sheets

56
18
10
20
52
54
50
16
58
2
22
2
12

(51) Int. Cl.

| | |
|---|---|
| ***A63F 9/02*** | (2006.01) |
| ***G07F 17/00*** | (2006.01) |
| ***A63F 13/20*** | (2014.01) |
| ***A63F 13/30*** | (2014.01) |
| *A63F 13/837* | (2014.01) |
| *E03D 13/00* | (2006.01) |

URINAL GAMING SYSTEM

CROSS REFERENCE TO RELATED APPLICATION

This application claims the benefit of U.S. Provisional Patent Application No. 61/548,977, filed Oct. 19, 2011, the entirety of which is hereby incorporated by reference into this application.

BACKGROUND OF THE INVENTION

Field of the Invention

The present invention relates to a gaming system which can be removably attached to a urinal and can provide multi-player gaming.

Description of Related Art

Devices for attracting the attention of males during urinating have been described. U.S. Pat. No. 7,373,673 describes a target permanently manufactured into a toilet or urinal. The target is used as a self competitive game, that triggers the subconscious mind as a training aide to revolutionize the world in health and hygiene. The target consisting of numbers and colored circles is spray painted onto a toilet bowl during manufacturing after the clay is fired and prior to the final glazing. The user can score himself by hitting the target in different locations. Closer to the center gives the individual more points. This target has the drawback of being permanently mounted to the toilet or urinal and has no capability for sensing or storing of results from hitting the target.

U.S. Pat. No. 7,194,776 describes a liquid stream analysis and feedback system wherein there is provided an acoustic sensor mounted on the outside of a toilet bowl and a simple, inexpensive target mounted to the inside of the toilet, thereby keeping the sensitive acoustic sensor and other electronics in a dryer and cleaner location. The sound of a urine stream contacting the target propagates through the toilet and is detected by the acoustic sensor. An analysis and feedback unit monitors the sound of the urine stream contacting the target and provides a message to the user indicating their success in hitting the target with the urine stream. The acoustic sensor is cumbersome and accuracy of the acoustic sensor is limited to distinguishing the sound of urine from other bathroom noises.

It is desirable to provide a urinal gaming system in which a pressure activated target is removably attached to a urinal or toilet and can be integrated into a multi-gaming system for providing an accurate, entertaining gaming system.

SUMMARY OF THE INVENTION

The present invention relates to a gaming system installable in a urinal or toilet in which a removably attached pressure and location sensor assembly can be wirelessly coupled to a data server. A top side of an enclosure of the pressure and location sensor can serve as a target surface. For example, the target can be a “bulls eye”.

A gaming application provided on the data server can include a user interface allowing the user to initiate a gaming session, such as through a touch screen monitor positioned above or nearby the urinal. The data server can collect and store data from the pressure and location sensor. The data server can be coupled to a plurality of touch screen monitors and pressure and location sensor assemblies for providing a multi-user gaming environment. Collected and processed data can be presented in real time on the touch screen monitors and can be stored in a database.

The invention will be more fully described by reference to the following drawings.

DETAILED DESCRIPTION OF THE INVENTION

Figure 1:
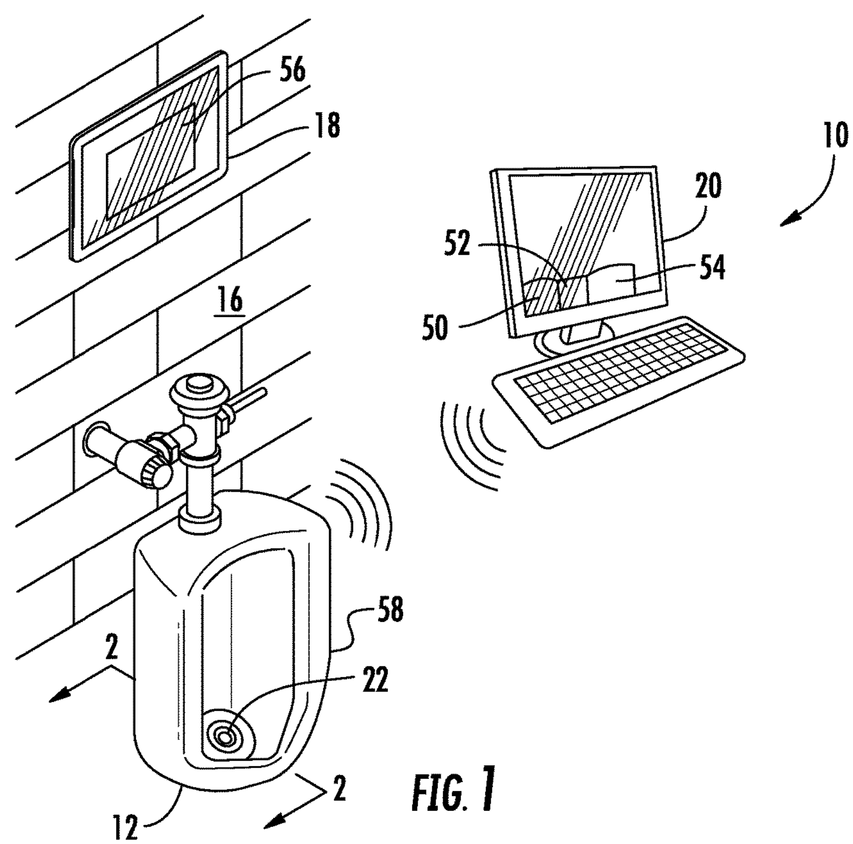
FIG. 1 is a perspective view of a gaming system installable in a urinal.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
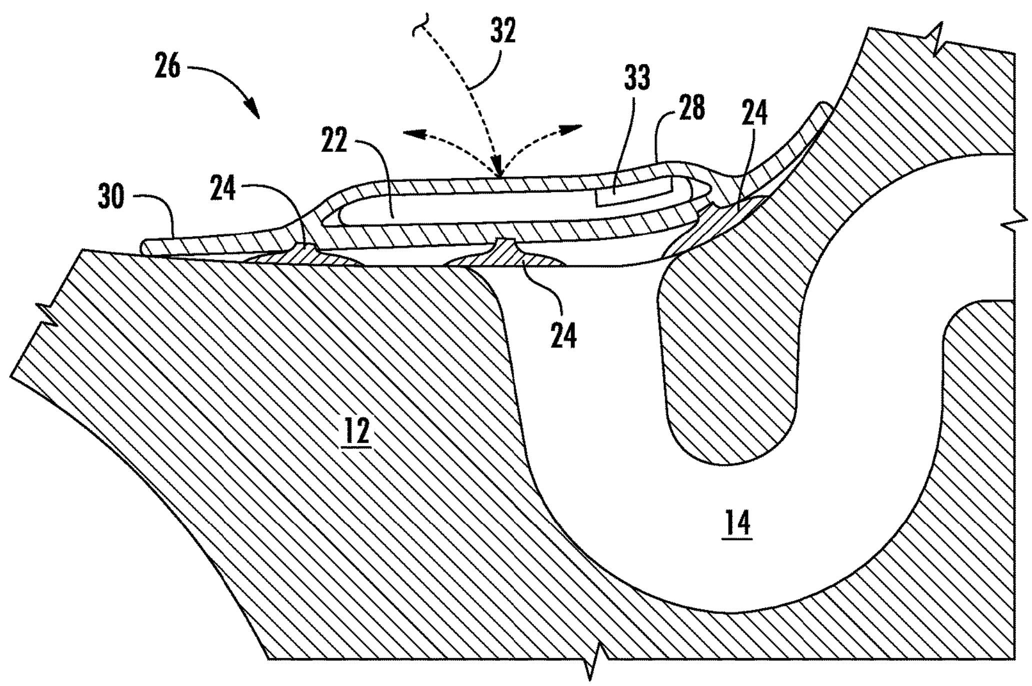
FIG. 2 is a detailed section view of the gaming system taken along line 2-2 of FIG. 1.
Figure 3:
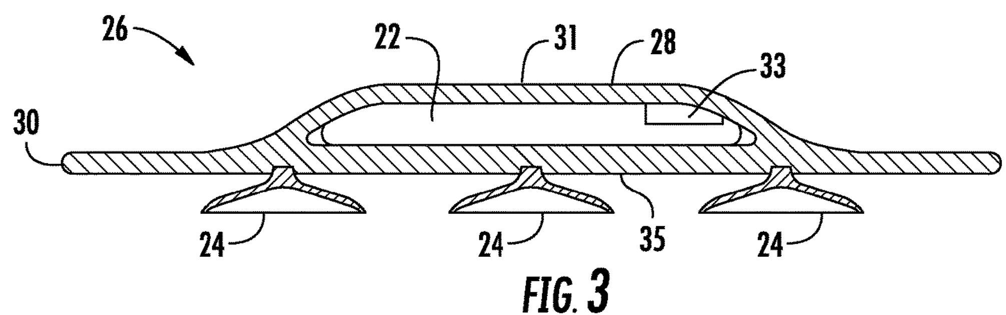
FIG. 3 is section view of a pressure and location sensor assembly that is part of the gaming system of FIG. 1.

FIG. 1 illustrates gaming system 10 removably installable in urinal 12, in accordance with the teachings of the present invention. Gaming system 10 can include pressure and location sensor assembly 26, as shown in FIGS. 2-3. Pressure and location sensor assembly 26 can be wirelessly coupled to data server 20.

Figure 4:
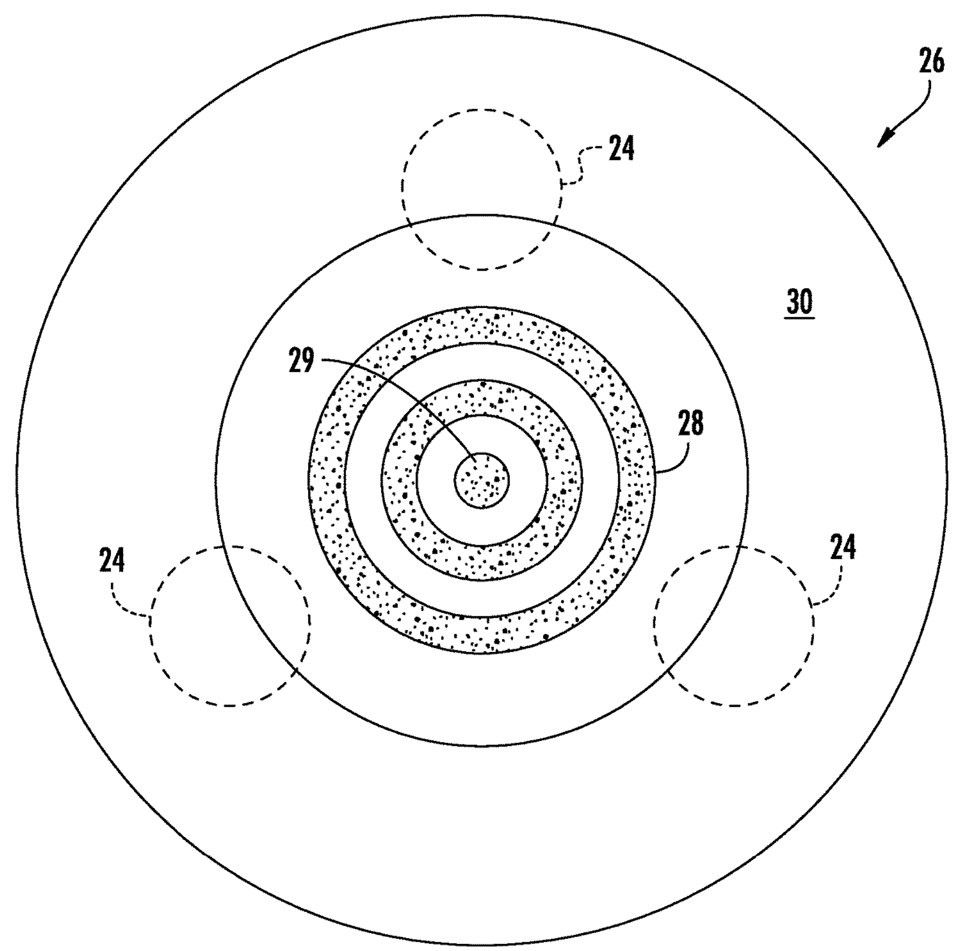
FIG. 4 is a top view of the pressure and location sensor assembly of FIG. 3.

Pressure and location sensor assembly 26 can include waterproof pressure and location sensor 22. Waterproof pressure and location sensor 22 can be a wireless, rechargeable sensor. Pressure and location sensor 22 can be disposed inside enclosure 30. Top side 31 of enclosure 30 can serve as target surface 28 for pressure and location sensor 22. For example, target surface 28 can be a “bulls eye”, as shown in FIG. 4. A patron can aim for center 29 of target surface 28. Pressure and location sensor 22 senses the pressure and location of a urine stream and the location of contact with the target surface, such that it can be determined how close the urine stream is to center 29 of the target. Remotely rechargeable power source 33 can be disposed inside enclosure 30 to power pressure and location sensor 22.

Three or more adhesion devices 24, for example, suction cups, can be formed on bottom side 35 of enclosure 30 to secure pressure and location sensor assembly 26 to urinal bowl 13 over urinal drain 14, as shown in FIGS. 2-4. Alternatively, adhesion devices 24 can be attached to a toilet bowl.

Referring to FIG. 1, pressure and location sensor 22 can be configured to capture and to transmit pressure distribution records 35 of urine stream 32 to data server 20. Data server 20 can control the operation of gaming system 10. Data server 20 can be removably located from urinal 12.

Figure 5:
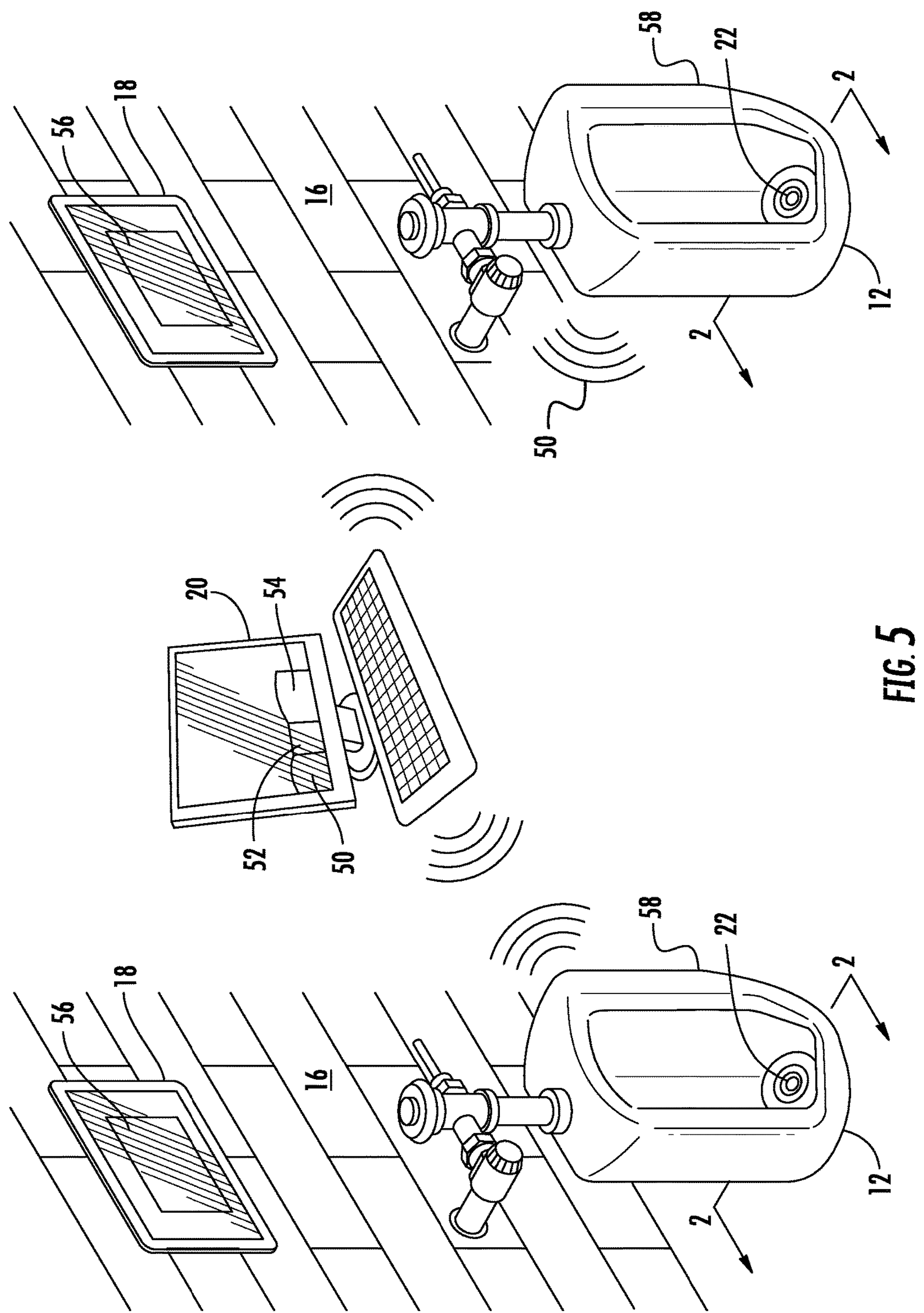
FIG. 5 is a schematic diagram of a plurality of pressure and location sensor assemblies and touch screen monitors communicating with a data server.

Data server 20 and touch screen monitor 18 can include software, firmware, and hardware components. Software component 50 can include a gaming application module 52 and database 54. Gaming application module 52 can provide user interface 56 allowing the user to initiate a gaming session through touch screen monitor 18. Data server 20 can be configured to collect and to store data 58 from pressure and location sensor 22. Collected and processed data 58 can be presented in real time on one or more touch screen monitors 18 and can be stored in database 54. Referring to FIG. 5, data server 20 can be coupled to a plurality of touch screen monitors 18 and pressure and location sensor assemblies 26. Gaming application module 52 can provide a multi-user gaming environment to interface with a plurality of user interfaces 56 and collect and store data 58 from a plurality of pressure and location sensors 22. After completion of a gaming session a customer whose score betters any previous score can enter his initials on touch screen monitors 18. When no gaming is initiated at a particular urinal bowl 12, data server 20 can present indicia 10 of game demos, advertisements, and "Leaderboard" or "High Score" style information on touch screen monitors 18.

Touch screen monitors 18 can be installed on wall 16 above urinal bowl 12 or adjacent to urinal bowl 12 or above or adjacent a toilet bowl. Touch screen monitors 18 can communicate wirelessly with data server 20.

Gaming system 10 can be installed, for example, in men's rooms of bars, restaurants, and casinos, and the like, to provide additional entertainment to customers of the establishments.

Embodiments of the present invention may be implemented in connection with a special purpose or general purpose computer that include both hardware and/or software components.

Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A gaming system, comprising:

a pressure and location sensor assembly for sensing pressure and location of a received urine stream in relation to a target and collecting data of the sensed pressure and location of the urine stream, the pressure and location sensor assembly includes a pressure location sensor disposed inside an enclosure, a top side of the enclosure having the target, the data of the pressure and location sensor is pressure distribution records of the urine stream contacting the target and the location of the urine stream contact with the target;

said assembly to be removably attachable to a urinal or toilet bowl;

a touch screen monitor positioned in the vicinity of the urinal or toilet bowl; and a data server including a processor, the data server wirelessly coupled to the pressure and location sensor assembly and the touch screen monitor, said data server collecting the data from the pressure and location sensor assembly and forwarding processed data from the processor on to the touch screen monitor for display, the touch screen monitor displays the collected and processed data in real time, wherein the pressure and location sensor assembly includes a pressure and location sensor disposed inside an enclosure, a top side of the enclosure having the target for said pressure and location sensor.

2. The gaming system of claim 1, wherein the pressure and location sensor assembly is water-proof.

3. The gaming system of claim 1, wherein the target is a bulls-eye.

4. The gaming system of claim 1, wherein the pressure and location sensor assembly is attached with a plurality of adhesion devices.

5. The gaming system of claim 4, wherein the pressure and location sensor assembly is attached with three or more adhesion devices, each of the adhesion devices comprising a suction cup coupled to said enclosure.

6. The gaming system of claim 1, wherein the collected data is stored in a database.

7. The gaming system of claim 1 comprising a plurality of pressure and location sensor assemblies each communicating with a respective touch screen monitor, said data server collect and store data from applicants of pressure and location sensors for providing a multi-user gaming environment.

8. The gaming system of claim 1, further comprising indicia displayed on said touch screen monitor.

9. A multiuser gaming system comprising:

a plurality of pressure and location sensor assemblies for sensing pressure and location of a received urine stream in relation to a target, each of said pressure and location sensor assemblies collecting data of the sensed pressure and location of the urine stream, the pressure and location sensor assembly includes a pressure location sensor disposed inside an enclosure, a top side of the enclosure having the target, the data of the pressure and location assemblies is pressure distribution records of the urine stream contacting the target and the location of the urine stream contact with the target, said assemblies to be removably attachable to a urinal or toilet bowl;

a plurality of touch screen monitors positioned in the vicinity of the respective urinal or toilet bowl; and a data server, the data server wirelessly coupled to the pressure and location sensor assemblies and the touch screen monitors, said data server collecting the data from the pressure and location sensor assemblies and forwarding processed data to the respective touch screen monitors for display, the touch screen monitor displays the collected and processed data in real time, wherein each of the pressure and location sensor assemblies includes a pressure and location sensor disposed inside an enclosure, a top side of the enclosure having a target for said pressure and location sensor.

10. The gaming system of claim 9, wherein each of the pressure and location sensor assemblies are water-proof.

11. The gaming system of claim 9, wherein the target is a bulls-eye.

12. The gaming system of claim 9, wherein each of the pressure and location sensor assemblies is attached with a plurality of adhesion devices.

13. The gaming system of claim 12, wherein each of the pressure and location sensor assemblies is attached with three or more adhesion devices, each of the adhesion devices comprising a suction cup coupled to said enclosure.

14. The gaming system of claim 9, wherein the collected data is stored in a database.

15. The gaming system of claim 9, further comprising indicia displayed on said touch screen monitor.

* * * * *